US006411363B1

(12) United States Patent
Kamada et al.

(10) Patent No.: US 6,411,363 B1
(45) Date of Patent: *Jun. 25, 2002

(54) IMAGE READING APPARATUS AND IMAGE FORMING APPARATUS THEREWITH

(75) Inventors: Takashi Kamada, Hino; Koji Washio, Hachioji, both of (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/491,199

(22) Filed: Jan. 25, 2000

(30) Foreign Application Priority Data

Jan. 29, 1999 (JP) ............................................ 11-021649

(51) Int. Cl.[7] ........................ G03B 27/68; G03B 27/52; H04N 1/40
(52) U.S. Cl. ............................ 355/52; 355/40; 358/471
(58) Field of Search .............................. 355/32, 40, 52, 355/407, 408; 358/471, 474; 271/3.14, 3.15; 399/367–369, 395

(56) References Cited

U.S. PATENT DOCUMENTS

| 5,034,781 A | * | 7/1991 | Watanabe | 355/317 |
| 5,181,260 A | * | 1/1993 | Kurosu et al. | 382/46 |
| 5,211,386 A | * | 5/1993 | Baba | 271/3.1 |
| 5,233,168 A | * | 8/1993 | Kulik | 235/456 |
| 5,373,371 A | * | 12/1994 | Masui | 358/444 |
| 5,805,306 A | * | 9/1998 | Kitsutaka et al. | 358/471 |
| 5,901,253 A | * | 5/1999 | Tretter | 382/289 |

* cited by examiner

Primary Examiner—Russell Adams
Assistant Examiner—Hung Henry Nguyen
(74) Attorney, Agent, or Firm—Frishauf, Holtz, Goodman & Chick, P.C.

(57) ABSTRACT

An image reading apparatus includes: a document holder on which a document is placed; a document positioning member, wherein the document is positioned on the document holder according to the document positioning member; an image reading device for reading an image of the document positioned on the document holder; and a correcting device for correcting an inclination of the image read by the image reading device according to an inclination of the document positioning member. The inclination of the document positioning member is an inclination on the document holder for a primary scanning direction.

34 Claims, 6 Drawing Sheets

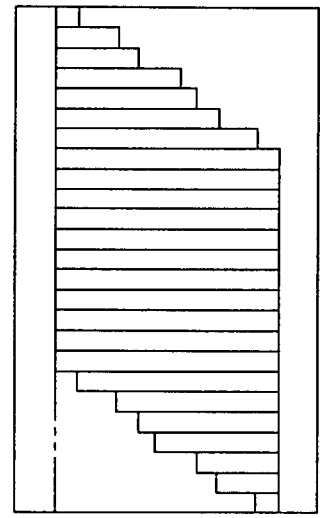
FIG. 3 (b)
DOCUMENT AFTER LONGITUDINAL CORRECTION
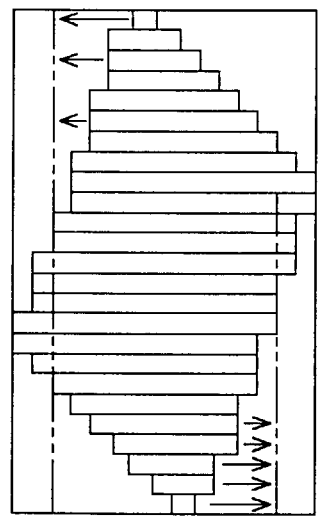
FIG. 3 (d)
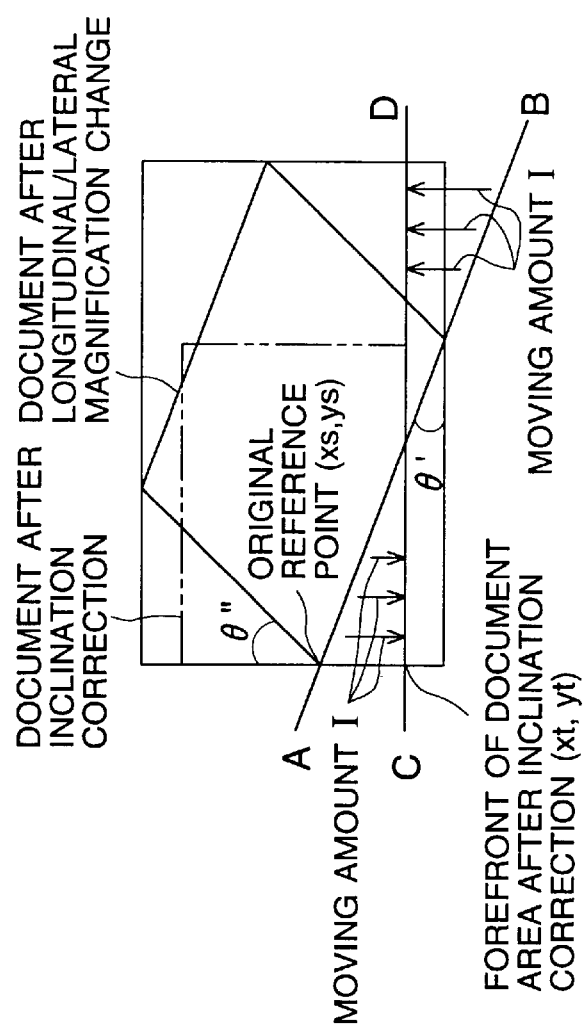
FIG. 3 (a)
FIG. 3 (c)

DOCUMENT AFTER INCLINATION CORRECTION

DOCUMENT AFTER LONGITUDINAL CORRECTION

DOCUMENT AFTER INCLINATION CORRECTION

MOVING AMOUNT J

δ

FIG. 5(a) FIG. 5(b) FIG. 5(c)
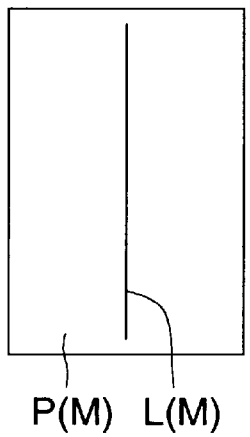
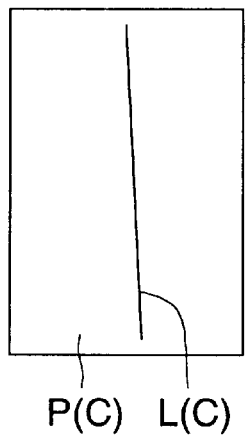
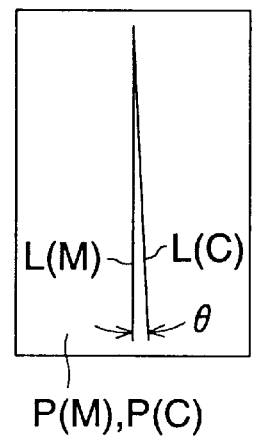
P(M)  L(M)          P(C)  L(C)        P(M),P(C)
FIG. 6(a)          FIG. 6(b)
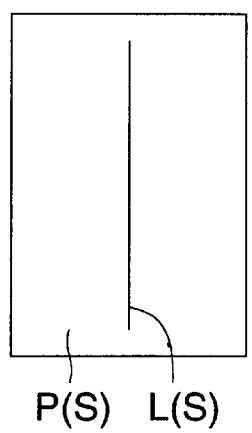
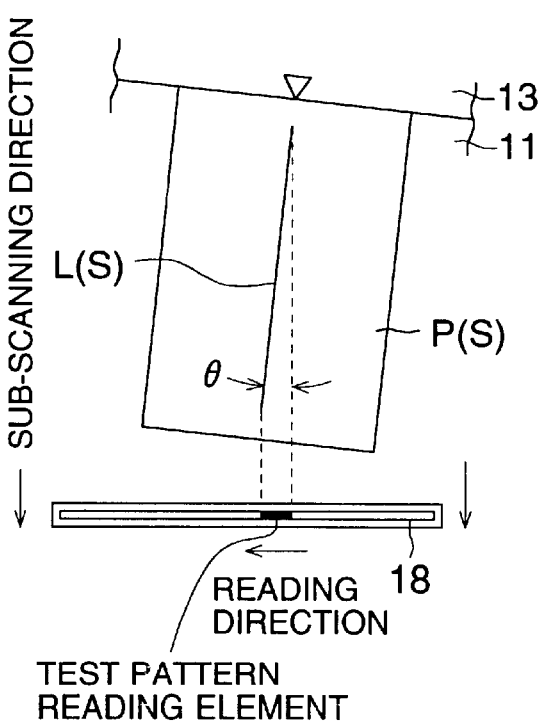
P(S)  L(S)

IMAGE READING APPARATUS AND IMAGE FORMING APPARATUS THEREWITH

BACKGROUND OF THE INVENTION

The present invention relates to an image reading apparatus which reads images on a document placed on a document holder, or on a document fed onto a document holder by a document feeder, and to an image forming apparatus having such image reading apparatus.

In a copying machine as an image forming apparatus, an image recording device forms an image on a recording material based on image data obtained by an image reading apparatus through reading. When reading images on a document with this image reading apparatus, the image reading apparatus is constituted so that an operator places a document on a document platen as a document holder by positioning the document to a reference plate as a document positioning member, and after that, the operator presses a copy start button to read images on the document on the document platen, for image forming.

A copying machine provided with an automatic document feeding means as a document feeder is arranged so that images on the document fed onto a document platen by the document feeder are read for image forming.

Incidentally, in a conventional copying machine, a reference plate which serves as a reference when placing a document on a document platen is mounted accurately by using an exclusive tool, so that an image on a document placed on a document platen may be read accurately for image forming. In the work of this kind, there have been repeated plural steps on a trial and error basis for adjustment, in each of the plural steps, after a document is positioned to the reference plate to be placed, and images read are recorded on a recording material, the image recorded on the recording material is confirmed visually by a serviceman or an assembly worker, and a position of the reference plate is adjusted based on the results of the confirmation. Therefore, this work has been extremely troublesome, and the time required for the work has been extremely long.

Problems identical to the foregoing are also caused on a copying machine wherein a document positioned to a reference plate to be placed on a document platen is read, and a document fed by an automatic document feeding means is read. Further, in the image reading apparatus stated above, the position where the reference plate is mounted and the position where the automatic document feeding means is mounted are independent from each other. Therefore, the adjustment work stated above is further extensive. In particular, in the case of the automatic document feeding means, not only the mounting position for the automatic document feeding means but also the slip of the conveyance system of the automatic document feeding means are causes, and adjustment work for them is vast.

When the reference plate is inclined to be mounted, images which have been read are inclined, because a document positioned on a document platen along the reference plate is inclined. Even in the case where an automatic document feeding apparatus which feeds a document automatically and stops it on a document platen without dashing against the reference plate is inclined to be mounted, the document stopped on the document platen is inclined, resulting in inclination on the read image. Even if the automatic document feeding apparatus is fixed correctly, when a document is inclined while it is conveyed, the read image is also inclined because the document is inclined to be stopped on the document platen. Further, in the case of an apparatus wherein images of a document are read while the document is being moved and conveyed by an automatic document feeding apparatus under the condition that an image reading device is stopped, the read image is distorted if the automatic document feeding apparatus is mounted to be inclined. Namely, in spite of a document which is rectangular, the read image is a parallelogram whose four corners are not at right angles.

With the background stated above, adjustment work for the mounting position for a document positioning member and adjustment work for the mounting positions of a document positioning member and an image reading device and for the slip of a conveyance system of the image reading device need to be simplified for accurate reading of images and accurate image forming.

SUMMARY OF THE INVENTION

The first object of the invention is to provide an image reading apparatus for reading a document by positioning the document to a document positioning member on a document holder manually, wherein accurate image forming which is free from inclination can be conducted even when a position of the document positioning member is not adjusted finely.

The second object of the invention is to provide an image reading apparatus which is capable of reading a document by positioning the document to a document positioning member on a document holder manually and is capable of reading a document fed by a document feeder, wherein accurate image forming which is free from inclination and/or distortion can be conducted for both manual positioning of a document and automatic feeding of a document, without requiring fine adjustment for a position of the document positioning member and adjustment of the slip of a conveyance system of the document feeder.

The third object of the invention is to provide an image forming apparatus which is capable of reading a document by positioning the document to a document positioning member on a document holder manually and is capable of reading a document fed by a document feeder for image forming, wherein adjustment for the mounting positions of the document positioning member and adjustment for the slip of a conveyance system of the document feeder are simplified, and accurate image forming which is free from inclination and/or distortion can be conducted.

The first object of the invention can be attained by an image reading apparatus having a document holder on which a document is placed to be positioned to a document positioning member, and an image reading device which reads images of a document placed on the document holder, wherein a correcting device which corrects an image inclination caused by the slip of the mounting position for the document positioning member.

The second object of the invention can be attained by an image reading apparatus having therein a document feeder which feeds automatically a document, a document holder on which a document is placed to be positioned to a document positioning member, an image reading device which can read images on a document even when the document is fed by the document feeder, or the document is placed on the document holder, and a correcting device which corrects an image distortion caused by the slip of conveyance by the document feeder, for the image data obtained by the image reading device through its reading, when the image reading device reads the document fed by the document feeder, and corrects an image inclination caused by the slip of the mounting position for the document positioning member, for the image data obtained by the image reading device through its reading, when the image reading device reads the document placed on the document holder.

The third object of the invention can be attained by an image forming apparatus having therein a document feeder which feeds automatically a document, a document holder on which a document is placed to be positioned to a document positioning member, an image reading device which can read images on a document even when the document is fed by the document feeder, or the document is placed on the document holder, a memory which memorizes inclination information based on an inclination of a feeding direction by the document feeder and inclination information based on the inclination of the document positioning member, a correcting device which corrects an image inclination caused by the slip of conveyance by the document feeder, for the image data obtained by the image reading device through its reading, based on the inclination information based on an inclination of the feeding direction by the document feeder stored in the memory, when the image reading device reads the document fed by the document feeder, and corrects an image inclination caused by the slip of the mounting position for the document positioning member, for the image data obtained by the image reading device through its reading, based on the inclination information based on the inclination of the document positioning member stored in the memory, when the image reading device reads images on the document placed on the document holder, an image recording device which records images on a recording material based on image data obtained by the image reading device through its reading, and a detecting means which detects conveyance slip information concerning the slip in the direction of conveyance of a document by the document feeder and document positioning member slip information concerning the slip of the mounting position for the document positioning member, wherein the memory stores the prescribed image information, the detecting means detects the conveyance slip information and/or the document positioning member slip information, based on image data obtained by the image reading device through its reading of the recording material on which an image is recorded by the image recording device based on the prescribed image information stored in the memory, and the conveyance slip information and/or the document positioning member slip information detected by the detecting means is stored in the memory.

Further, one of the above objects of the invention can be attained by any one of the following structures (1) through (5).

(1) An image reading apparatus includes: a document holder on which a document is placed; a document positioning member, wherein the document is positioned on the document holder according to the document positioning member; an image reading device for reading an image of the document positioned on the document holder; and a correcting device for correcting an inclination of the image read by the image reading device according to an inclination of the document positioning member, wherein the inclination of the document positioning member is an inclination on the document holder for a primary scanning direction.

(2) An image reading apparatus includes: a document holder on which a document is placed; a document feeder for feeding the document in a feeding direction and stopping the document on the document holder; an image reading device for reading an image of the document stopped on the document holder, wherein the image reading device moves to a sub-scanning direction so as to read the image; and a correcting device for correcting an inclination of the image read by the image reading device according to an inclination of the feeding direction by the document feeder, wherein the inclination of the feeding direction is an inclination on the document holder for the sub-scanning direction.

(3) An image forming apparatus includes: a document holder on which a document is placed; a document positioning member, wherein the document is positioned on the document holder according to the document positioning member; an image reading device for reading an image of the document positioned on the document holder; a correcting device for correcting an inclination of the image read by the image reading device according to an inclination of the document positioning member, wherein the inclination of the document positioning member is an inclination on the document holder for a primary scanning direction; and an image recording device for recording the image corrected by the correcting device on a recording material.

(4) An image forming apparatus includes: a document holder on which a document is placed; a document feeder for feeding the document and stopping the document on the document holder; an image reading device for reading an image of the document stopped on the document holder, wherein the image reading device moves to a sub-scanning direction so as to read the image; a correcting device for correcting an inclination of the image read by the image reading device according to an inclination of the feeding direction by the document feeder, wherein the inclination of the feeding direction is an inclination on the document holder for the sub-scanning direction; and an image recording device for recording the image corrected by the correcting device on a recording material.

(5) An image reading apparatus includes: a document feeder for feeding a document to an image reading position; an image reading device for reading an image of the document being fed by the document feeder at the image reading position; and a correcting device for correcting a distortion of the image read by the image reading device.

Each of FIGS. 3(a)–3(d) is an illustration which shows illustratively longitudinal correction of image data.

Each of FIGS. 4(a)–4(d) is an illustration which shows illustratively lateral correction of image data.

Each of FIGS. 5(a)–5(c) is an illustration which shows a method to obtain an inclination angle.

Each of FIGS. 6(a) and 6(b) is an illustration which shows another method to obtain an inclination angle.

Figure 7:
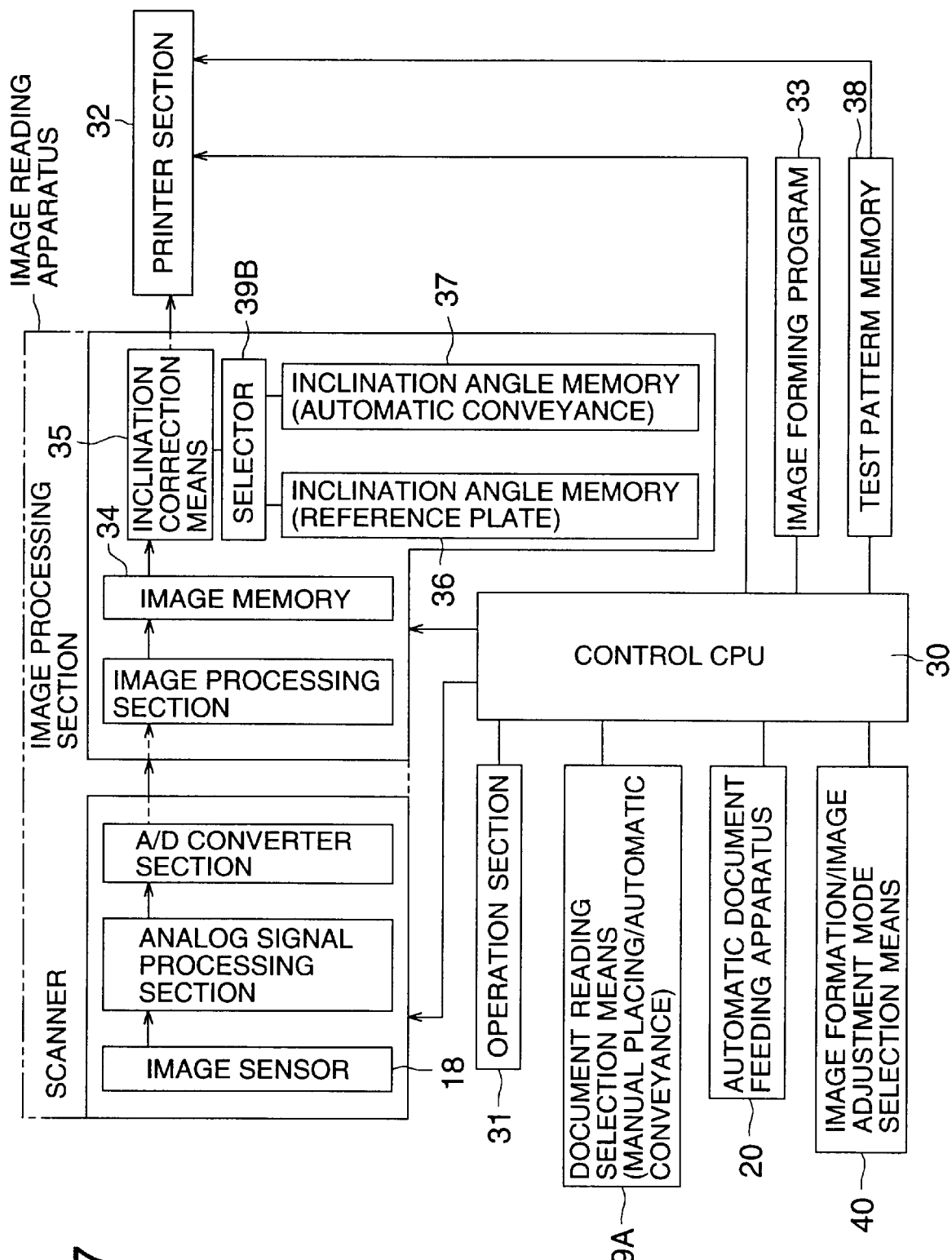

FIG. 7 is a block diagram showing a flow of image reading and image forming in Embodiment 2.

DETAILED DESCRIPTION OF THE PREFERRED EMBODIMENT

An embodiment will be explained, referring to an image forming apparatus (copying apparatus) equipped with an image reading apparatus having an automatic document feeding apparatus.

FIG. 1(a) is a schematic structure diagram of an image reading apparatus, and FIG. 1(b) is an external perspective view of the image reading apparatus. Incidentally, a printer section is omitted in FIGS. 1(a) and 1(b). Image reading apparatus 1 in the present embodiment is one wherein automatic document feeding apparatus 20 as a document feeder is provided on image reading apparatus main body 10, and images on any of the document conveyed by the automatic document feeding apparatus 20 and the document placed directly on document platen 11 as a document holder can be read.

First, an outline of reading the document fed by automatic document feeding apparatus 20 will be explained.

A user places a document to be read on document placing table 21. In this case, the feeding direction of the document is regulated by regulating member 22 which is provided on the document placing table 21. Then, when the user presses a reading start button (not shown) of operation section 31 (constituted with a touch panel or the like) which serves as a display means and an inputting means provided on the front side of image reading apparatus main body 10, the start of reading is instructed.

Receiving the instruction of the start of reading, a document conveyance means conveys a document placed on document placing table 21 to document platen 11. Namely, the document placed on the document placing table 21 is separated into a sheet to be fed out by group of feed-out rollers 23, and is conveyed by conveyance belt 27 trained about follower roller 24, driving roller 25 and tension roller 26 to the position for reading on document platen 11, while being sandwiched between the conveyance belt 27 and document platen 11, thus, the document is placed on the document platen 11.

In the present embodiment, a stepping motor is used as a driving source (not shown) for driving roller 25, and by controlling the number of pulses impressed on the stepping motor, a document can be stopped at a reading position without hitting reference plate 13 as a document positioning member. However, the invention is not limited to an automatic document feeding apparatus of a type wherein a document is stopped at a reading position without hitting a reference plate.

When a document is placed on document platen 11, the document is subjected to irradiation of light conducted by light source 14 representing a linear light source extending in the primary scanning direction (direction perpendicular to the page in FIG. 1(a)). Light reflected on the document is focused as an image on image sensor 18 representing an image pick-up means by lens 17 representing an image forming means, through first mirror 15 and V mirror 16. The image sensor 18 is a means to read images on a document, and is a photoelectric transfer element which photoelectrically transfers light reflected on the document for each pixel, and it is constituted of line sensor (line CCD) extending so as to have a plurality of pixels in the primary scanning direction to read images on the document in a unit of one line in the primary scanning direction.

An image reading device is constituted by light source 14, first mirror 15 and V mirror 16.

It is structured so that light source 14 and first mirror 15 move solidly in the sub-scanning direction perpendicular to the primary scanning direction (direction to the right side in FIG. 1(a)), and V mirror 16 moves in the same direction at the moving speed which is half that of the light source 14 and first mirror 15. Therefore, when the light source 14, first mirror 15 and V mirror 16 move in the sub-scanning direction for the document on the document platen 11, it is possible to scan the entire surface of the document, thus, images equivalent to one sheet of document can be read by reading successively the light reflected on the document with image sensor 18.

The document on which images on its entire surface have been read by image sensor 18 is conveyed by conveyance belt 27 and is ejected on sheet ejection tray 29 by group of sheet ejection rollers 28.

In image reading apparatus 1, an arrangement is made so that not only a document conveyed by automatic document feeding apparatus 20 but also a document placed directly on document platen 11 can be read. Namely, the automatic document feeding apparatus 20 is provided on image reading apparatus main body 10 through hinges 19 in such a way that the automatic document feeding apparatus can be opened and closed (or can be raised from and lowered) onto the image reading apparatus main body.

Therefore, when placing a document directly on document platen 11 to read it, a user opens automatic document feeding apparatus 20 (FIG. 1(b)), then, places a document to be read on document platen 11, and closes the automatic document feeding apparatus 20 so that the state shown in FIG. 1(a) may be returned. When the user places a document on the document platen 11, in this case, the user places the document so that it may be in line with reference plate 13 which is provided to be adjacent to the document platen 11. Then, the user instructs the start of reading, by pressing a start reading button on operation section 31. After that, in the same way as in the foregoing, images on the document placed on the document platen 11 are read. In this case, however, even when a start button is pressed, the automatic document feeding apparatus 20 is not driven, which is different from the foregoing.

As stated above, image reading apparatus 1 of the present embodiment has, as an image reading device, document platen 11 on which a document is placed, conveyance belt 27 which functions as a document platen cover which covers the document platen 11 through the document placed on the document platen 11, a scanning means which scans the surface of the document platen 11 along the bottom surface of the document platen 11 (light source 14, first mirror 15 and V mirror 16), and image sensor 18 which is scanned by a scanning means and transfers photoelectrically the reflected light from the document platen, and thereby, images on the document platen 11 are read by the image reading device, and then, are subjected to amplification processing and AD conversion to be obtained as image data, and are stored in image memory 34 (see FIG. 2) representing a memory means.

Incidentally, with regard to image data obtained by the image reading apparatus through its reading, image data for a broader area (hereinafter referred to as a reading area) including an area (hereinafter referred to as a document area) of a document placed on document platen 11 can be read for the purpose of complying with various sizes of documents.

When a document is placed on document platen 11 in the image reading apparatus 1 stated above, the read image data are in the state wherein image data for the document area are inclined. Therefore, when these image data are used for image forming, broken images result, and accurate image forming is impossible.

Figure 2:
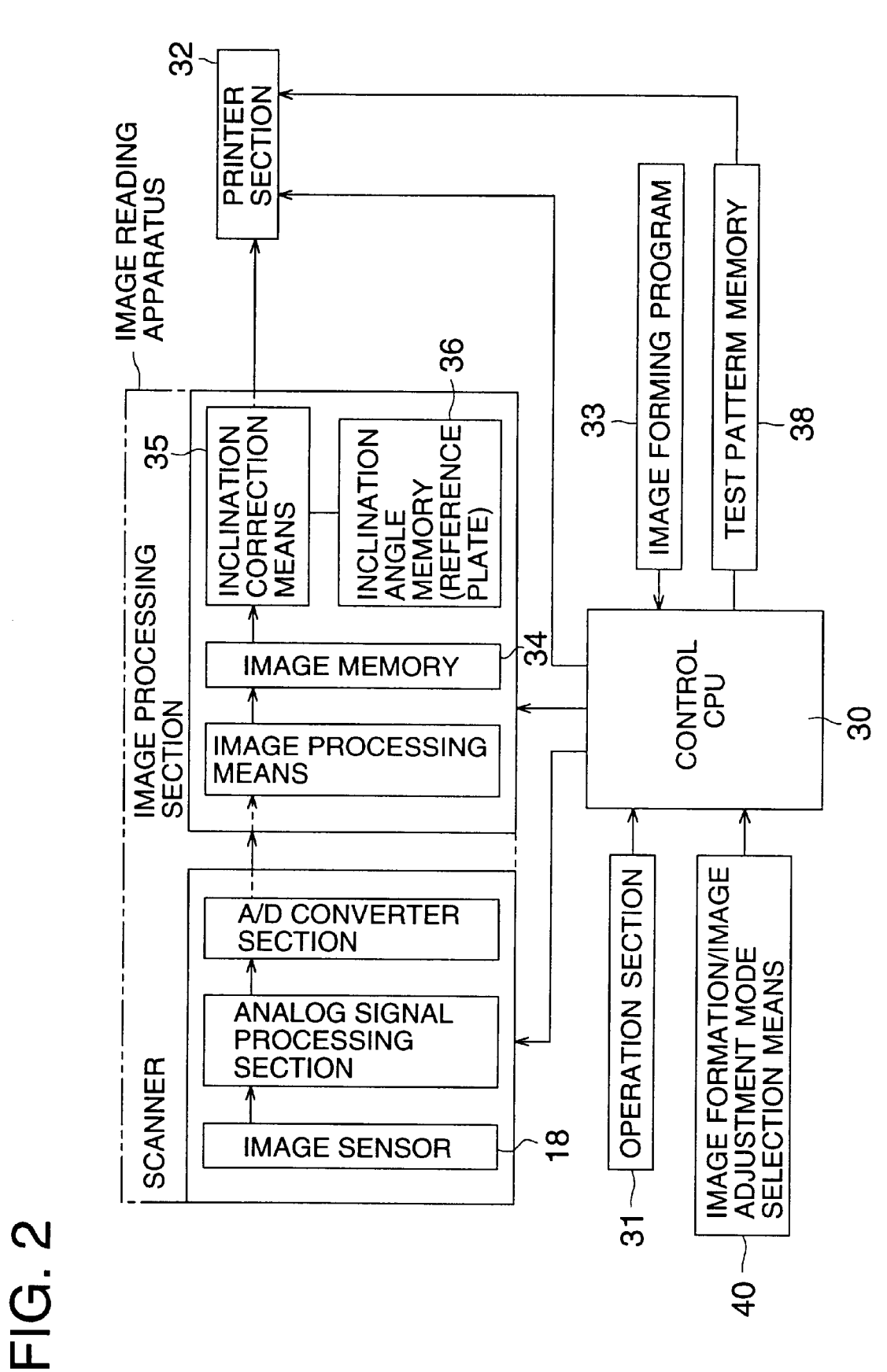
FIG. 2 is a block diagram showing a flow of image reading and image forming in Embodiment 1.

Therefore, the present embodiment is structured so that inclination correction (correcting an inclination) may be conducted for the image data of an inclined document area. FIG. 2 is a block diagram showing illustratively a flow of image data with regard to outline of inclination correction of the present embodiment. Incidentally, FIG. 2 is a diagram of the occasion for using image reading apparatus 1 as a scanner of a copying machine, wherein when forming images, image data stored in image memory 34 are subjected to image processing such as shading correction by an image processing means (having no symbol), filtering of spatial frequency, γ transformation, error dispersion processing, and image discrimination/correction processing, or the image data are subjected to image processing before they are stored in image memory 34, thus, image forming is conducted by printer section 32 based on image data which have been subjected to image processing.

Embodiment 1

The first embodiment of the invention will be explained as follows. Since a document to be manually placed on document platen 11 is placed to be in line with reference plate 13 which serves as a reference for placing, if the reference plate 13 is inclined, all documents placed on the document platen 11 are equally inclined, and image data obtained through reading are also inclined. Therefore, in the invention, there is provided an inclination correction means which corrects image inclination caused by slip (inclination angle) of the mounting position of the reference plate 13. With regard to the slip (inclination angle) of the mounting position of the reference plate 13, it is stored in a memory as information of the reference plate slip, and when reading a document, the inclination correction means corrects image inclination caused by the slip of the mounting position of reference plate 13, for the image data obtained through reading based on the information of the reference plate slip stored in a memory.

Namely, for the document placed on document platen 11 to be in line with reference plate 13, scanning means (light source 14, first mirror 15 and V mirror 16) operate, and images on the document are read by image sensor 18. Image information converted photoelectrically by the image sensor 18 is amplified in an analog signal processing section, then, is converted into digital signal in an AD conversion section, and the digitized image data are subjected to image processing in an image processing section.

After the shading correction and γ transformation are conducted by the image processing means in the image processing section, image data are stored temporarily in image memory 34. The image data stored in the image memory 34 are called again, then, inclination angle θ of the image data caused by inclination of reference plate 13 when a document is placed on document platen 11 is corrected by inclination correction means 35, and the image data are outputted to printer section 32. The correction of inclination angle θ by the inclination correction means 35 is conducted by the use of data of inclination angle θ stored in inclination angle (reference plate) memory 36.

Next, image correction conducted by inclination correction means 35 based on inclination angle θ stored in a memory as information of reference plate slip will be explained.

As a method to correct the image read under inclination angle θ, the affine transformation is generally known. Since this affine transformation is one to conduct matrix operation of 2×2 for each pixel, an amount of operation is large, and memory capacity needs to be great. In the present embodiment, therefore, images are corrected through data shift processing wherein an amount of calculation and a memory proposed in Japanese TOKKAIHEI No. 10-285379 by the inventors of the invention are more economical. When correcting images through the affine transformation, it is possible to correct image inclination by rotating image data, but it is not possible to correct image distortion. On the contrary, when correcting images through data shift processing, it is possible to correct not only image inclination but also image distortion. The data shift processing is one to conduct image correction, by shifting image information in a unit of pixel stored in image memory 28 representing an image memory means as longitudinal correction or lateral correction. When conducting image correction through the data shift processing, it is preferable to change longitudinal magnification and lateral magnification separately, because magnification and an aspect ratio of a document are changed. The technology to change magnification in accordance with an inclination angle of a document before conducting data shift processing has been proposed by the inventors of the invention in Japanese TOKKAIHEI No. 10-336425.

Data shift processing representing an inclination correction means is processing to correct images read by a reading means, based on inclination angle θ of a document stored in memory 36 for inclination angle caused by the slip of the mounting position for reference plate 13. This is conducted by shifting image data stored in image memory 34 with inclination correction means 35 representing a correction means. Namely, in the present embodiment, the inclination correction means 35 is a means to correct inclination by conducting data shift on image memory 34, and it obtains an amount (moving amount) to move each pixel in the longitudinal direction (primary scanning direction) and lateral direction (sub-scanning direction), in accordance with inclination angle θ stored in inclination angle memory 36, and it moves each pixel based on the moving amount to correct image inclination. Details of the foregoing will be explained as follows. Incidentally, in the following explanation, lateral correction is conducted after longitudinal correction, but, longitudinal correction may also be conducted after lateral correction.

First, the longitudinal correction will be explained based on FIGS. 3(a)–3(d) where the longitudinal correction is shown illustratively. FIG. 3(a) is a diagram showing illustratively image data (document) before longitudinal correction, FIG. 3(b) is a diagram showing illustratively image data (document) after longitudinal correction, and each of FIGS. 3(c) and 3(d) is a diagram showing the data shift of longitudinal correction in an image style.

In FIG. 3(a), image data are shifted (moved) in the longitudinal (primary scanning) direction so that straight line AB which is in parallel with a side of a document and includes document reference point (xs, Ys) may be in line (agree) with straight line CD which is in parallel with the sub-scanning direction (x direction) and includes "forefront of document area after correction of inclination", namely, an origin. In this case, no shift (movement) in the lateral (sub-scanning) direction is allowed. Shifting (moving) amount I in the longitudinal direction is shown as follows, on the assumption that a given point in image data is represented by (x, y).

$$I = ys - x \cdot \tan \theta'$$

In FIGS. 3(a), image data are moved downward when I is smaller than 0, and are moved upward when I is greater than 0. Incidentally, θ' represents a function of θ which is shown below.

$$\theta' = \operatorname{Tan}^{-1}(\tan \theta \cdot \cos^2 \theta)$$

Therefore, moving amount I is a function of x, and it does not depend on y, and data having the same y have the same moving amount I. Thus, image data before longitudinal correction have only to be shifted on image memory 34 to become those indicated in FIG. 3(d) in accordance with moving amount I, after pixels (pixels each partitioned by x) in the primary scanning direction are grouped as shown in FIG. 3(c). Namely, mere movement in the primary scanning (y, longitudinal) direction is enough, and it is possible to conduct by collecting plural pixels, and it is possible to conduct by calculating moving amount I for each group of pixels partitioned by x.

Then, image data after longitudinal correction turn out to be those shown in FIG. 3(b). Incidentally, angle δ (see FIG. 3(b)) formed between an oblique side of image data after longitudinal correction and the primary scanning direction is represented by a function of θ as shown in the following expression wherein θ"=Tan$^{-1}$ (tan θ/cos$^2$θ) holds.

$$\delta = \mathrm{Tan}^{-1}(1/(1/\tan\theta'' + \tan\theta'))$$
$$= \mathrm{Tan}^{-1}(1/(\cos^2\theta(1/\tan\theta + \tan\theta)))$$

Next, lateral correction will be explained as follows, referring to FIGS. 4(a)–4(d) each showing the lateral correction illustratively. FIG. 4(a) is a diagram showing image data (a document) before lateral correction (and after longitudinal correction) illustratively, FIG. 4(b) is a diagram showing image data (a document) after lateral correction (and after inclination correction) illustratively, and each of FIGS. 4(c) and 4(d) is a diagram showing data shift of lateral correction illustratively.

In FIG. 4(a), image data are shifted (moved) in the x direction (which is the sub-scanning direction, and is also called the lateral direction) so that an oblique line may be made perpendicular. In this case, shifting (moving) in the longitudinal (primary scanning) direction is not allowed.

Shifting (moving) amount J in the lateral direction is shown as follows, on the assumption that a given point in image data is represented by (x, y).

$$J = -y \cdot \tan \delta$$

Figure 4:
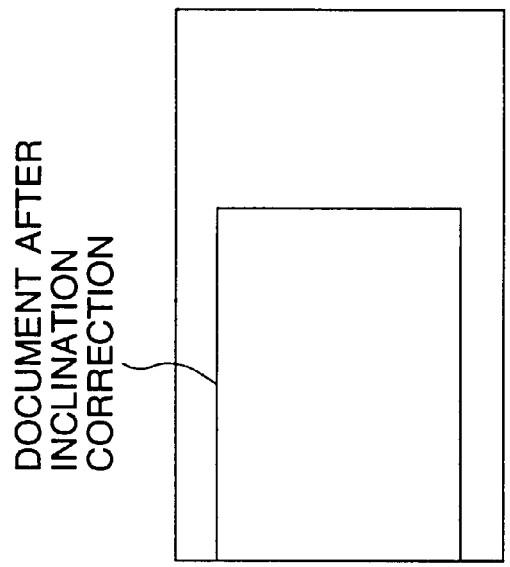
Figure 4:
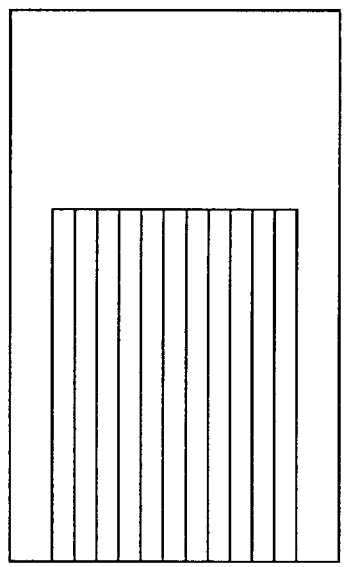
Figure 4:
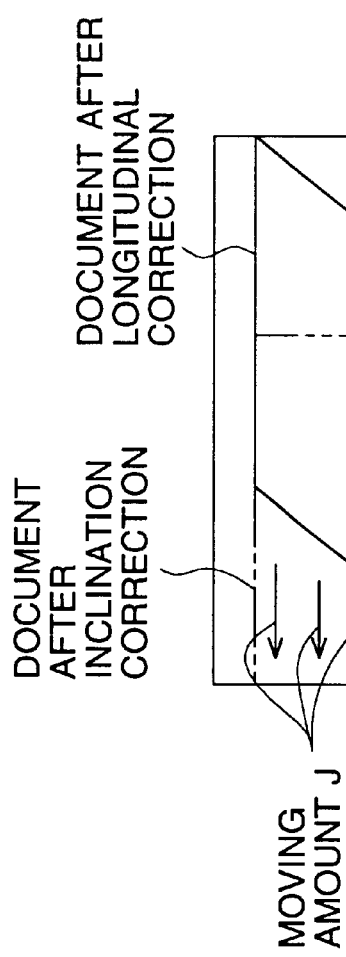
Figure 4:
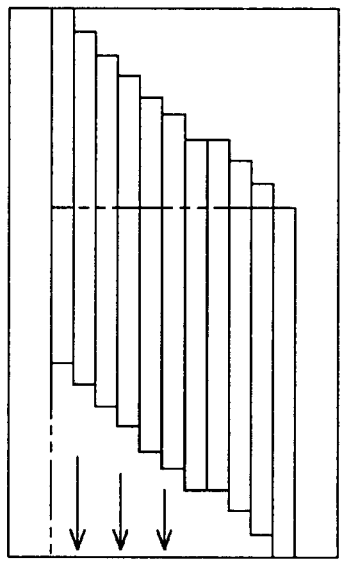

In FIG. 4, image data are moved to the left side when J is smaller than 0, and are moved to the right side when J is greater than 0.

Therefore, moving amount J is a function of y, and it does not depend on x, and data having the same x have the same moving amount J. Thus, image data before lateral correction have only to be shifted on image memory 34 to become those indicated in FIG. 4(d) in accordance with moving amount J, after pixels (pixels each partitioned by y) in the sub-scanning direction are put together as shown in FIG. 4(c). Namely, mere movement in the sub-scanning (x, lateral) direction is enough, and it is possible to conduct by grouping plural pixels, and it is possible to conduct by calculating moving amount J for each group of pixels partitioned by y.

As stated above, it is possible to conduct inclination correction by performing data shift processing wherein image data of document D stored in image memory 34 are shifted by an inclination correction means based on inclination angle θ stored in inclination angle memory 36. Namely, it is possible to conduct inclination correction by moving (shifting) pixels on a memory after grouping them into each y (primary scanning, longitudinal) or x (sub-scanning, lateral) through longitudinal correction or lateral correction. Thus, total amount of calculation for moving amount I and J can be small, and calculation of moving amount for (x+y) times is enough concretely for image data of (x+y) pixels, thereby, the number of operations is reduced, compared with moving amount calculation for (x+y) times of affine transformation, complicated operations are not needed, the time required for inclination correction is shortened, and low cost can be attained without using many memories.

Next, there will be explained inclination angle (reference plate) memory 36 which is used when inclination of image data is corrected by inclination correction means 35.

One of methods for setting an inclination angle representing a slip in the inclination angle (reference plate) memory 36 is a method to input directly an inclination angle from operation section 31. In this case, an image adjustment mode is selected by mode image-forming/image-adjustment selection means 40, control CPU 30 calls test pattern information stored in test pattern memory 38, and outputs it to printer section 32, and images of the test pattern are recorded on a recording material.

As a test pattern, a line extended in the primary scanning direction or in the sub-scanning direction, for example, is used. Each of FIGS. 5(a)–5(c) shows an example, and FIG. 5(a) shows a state wherein test pattern information extending from test pattern memory 38 in the sub-scanning direction is called to be outputted to printer section 32, and a test pattern of L (M) is recorded on recording material P (M). Then, recording material P (M) having the test pattern of L (M) is placed on document platen 11 to be in line with reference plate 13 for copying. FIG. 5(b) shows a state of the copy, and copied image L (C) of the test pattern is formed on recording material P (C).

A serviceman can actually measure inclination angle θ shown in FIG. 5(c) by overlapping recording material P (M) and recording material P (C) for studying. The inclination angle θ measured actually is inputted in inclination angle (reference plate) memory 36 by the use of Ten-key as an inputting device.

Moreover, when the image forming apparatus is connected to an outside inputting device such as a personal computer, it is also possible to be structured so that data representing inclination angle θ of the reference plate is inputted from the personal computer and stored into inclination angle memory 36.

Another method to set an inclination angle in inclination angle (reference plate) memory 36 is a method to use image sensor 18 as a detection means for inclination angle θ. For example, a straight line having a prescribed length extended in the sub-scanning direction is used as a test pattern, then, test pattern information is called from test pattern memory 38 as shown in FIG. 6(a) to be outputted to printer section 32, and test pattern L (S) is formed on recording material P (S). Then, recording material P (S) having test pattern of L (S) is placed to be in line with reference plate 13 of document platen 11, and image sensor 18 representing line charge coupled device "CCD" scans the recording material for image reading. It is detected how many pixels of line CCD read the line portion of the test pattern in either the left direction or the right direction while the entire image plane of the recording material P (S) is scanned by the image sensor 18. FIG. 6(b) is an illustration showing the state of this detection.

In control CPU 30, operation processing for inclination angle θ is conducted by inputting the detection results stated above in the operation program which is set in advance. The inclination angle θ obtained by the operation processing is inputted, as it is, in inclination angle (reference plate) memory 36, or the inclination angle θ obtained by the operation processing is displayed on the display section provided on operation section 31, and a serviceman inputs the inclination angle θ displayed on the display section in inclination angle (reference plate) memory 36 by using Ten-key.

Moreover, when the image forming apparatus is connected to an outside inputting device such as a personal computer, it is also possible to be structured so that data representing inclination angle θ of the reference plate is inputted from the personal computer.

As an other method for inputting the inclination angle onto the inclination angle memory 36 in addition to the method for inputting by operating ten keys, there may also be considered a method for inputting from an outside inputting device such as a personal computer or the like by connecting the outside inputting device to the image forming apparatus.

Obtaining the inclination angle θ is conducted in the image adjustment mode, and it is preferable that the aforesaid adjustment process is repeated several times to obtain inclination angle θ as a mean value, and it is inputted in inclination angle (reference plate) memory 36 to be used for inclination correction for image data thereafter.

Embodiment 2

The second embodiment of the invention will be explained as follows. The present embodiment is represented by an image reading apparatus capable of reading both a document placed manually to be in line with a reference plate on a document platen and a document conveyed by a document feeder and an image forming apparatus having the image reading apparatus, wherein there is provided a correction means which corrects inclination and/or distortion of the read image for both occasions of placement of a document on the document platen and of automatic document feeding, and FIG. 7 is a block diagram showing the flow of image reading and image forming in the copying apparatus. Incidentally, the present embodiment is one wherein a correction means to correct distortion of the read image even in the case of automatic document feeding is added to the embodiment explained in Embodiment 1 in which a document is placed manually on a document platen, and therefore, explanation of the overlapped portions will be omitted partially.

Further, the present embodiment is represented by an apparatus wherein an automatic document feeding apparatus employing a stepping motor in a driving source for a document conveyance means is used, and a document can stop without hitting reference plate 13 with its end portion, when the document is stopped at a reading position where the document is read.

Figure 1:
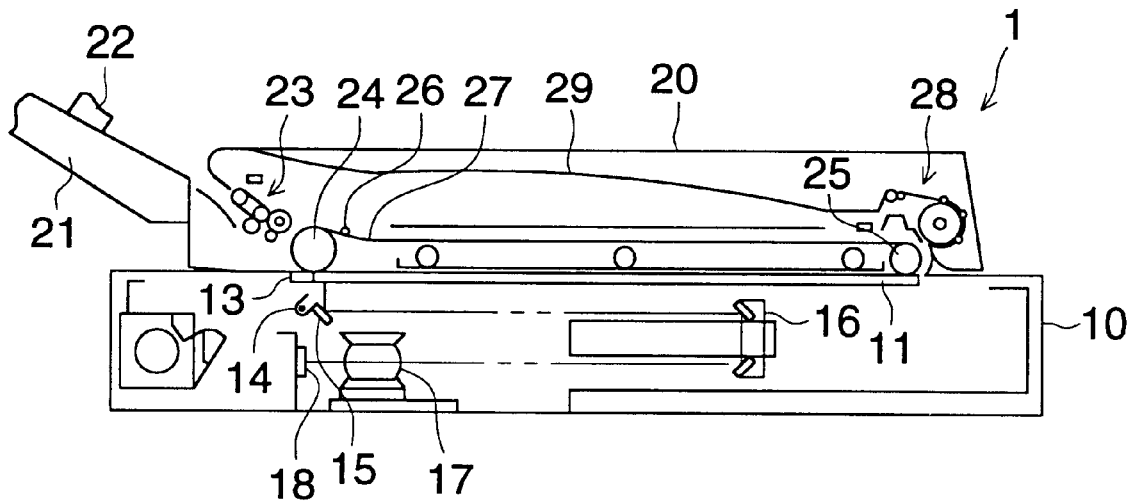
FIG. 1(a) is a schematic structure diagram of an image reading apparatus.
FIG. 1(b) is an external perspective view of the image reading apparatus.
Figure 1:
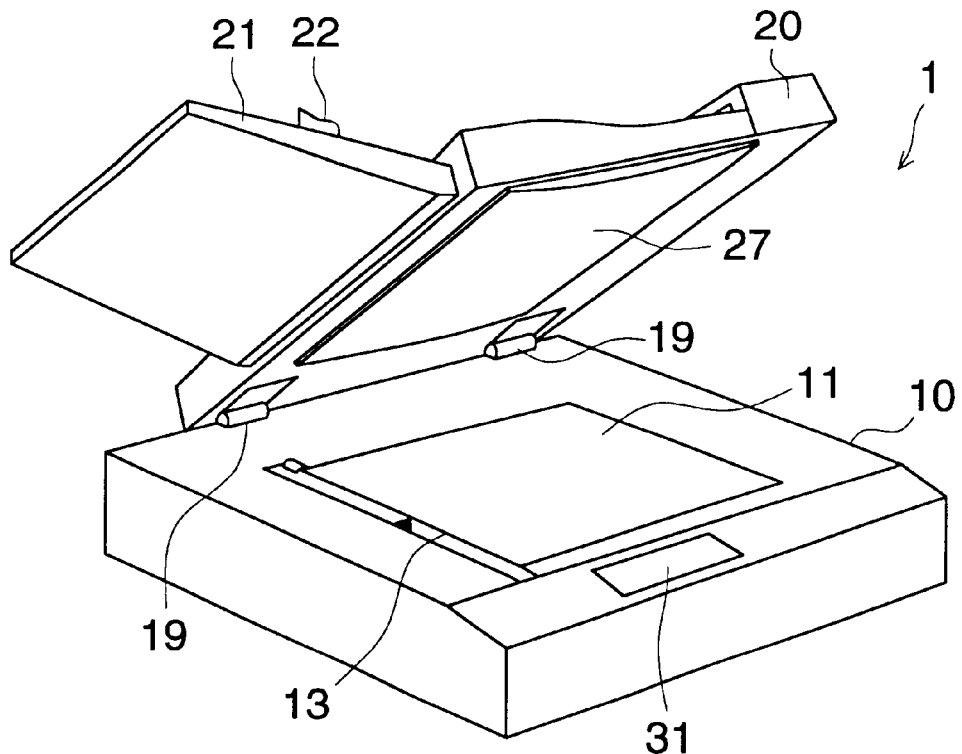

In a document reading apparatus shown in FIGS. 1(*a*) and 1(*b*), when a document is placed on document platen 11 to be in line with reference plate 13, or when a document is placed on document platen 21 to be in line with regulating member 22, and a reading start button provided on operation section 31 is pressed, document reading selection means 39A discriminates the document whether it is placed manually or through automatic feeding, and when the document is discriminated to be one placed through automatic feeding, automatic document feeding apparatus 20 operates, and a document on the document platen 21 is separated and conveyed one by one to stop at the reading position on the document platen 11. When the document is discriminated to be one placed manually, the automatic document feeding apparatus 20 does not operate and images on the document are read immediately.

Reading of images on the document in the case wherein the document is discriminated to be one placed manually will be explained, first. The document placed on the document platen 11 to be in line with reference plate 13 is subjected to reading of images on the document by image sensor 18, under the condition that a scanning means operates, then, image data are digitized and are subjected to image processing such as shading correction and γ transformation, to be stored once in image memory 34. The image data stored in image memory 34 are called again, and are subjected to correction of inclination angle θ conducted by inclination correction means 35. For the correction of image data having inclination angle θ conducted by the inclination correction means 35, inclination angle data stored in inclination angle (reference plate) memory 36 selected by selector 39B are used.

The selector 39B interlocks with document reading selection means 39A, and when the document reading selection means 39A discriminates a document to be a manually placed document, inclination angle θ caused in placing on the document platen is called from inclination angle (reference plate) memory 36 by the selector 39B, and when the document reading selection means 39A discriminates a document to be one fed automatically, inclination angle θ' caused in automatic document feeding is called from inclination angle (automatic conveyance) memory 37 by the selector 39B, and thereby, correction of image data is conducted by inclination correction means 35. The image data which have been subjected to the correction stated above are outputted to printer 32, and image forming on a transfer material is conducted through image forming program 33.

When the document reading selection means 39A discriminates a document to be one fed automatically, automatic document feeding apparatus 20 operates, and the document is conveyed to the reading position on document platen 11 to stop there. Between the reading position on the document platen 11 related to automatic document feeding and the reading position on the document platen 11 related to manual placing, there is a difference of slip (inclination angle), and when image processing is conducted by the same inclination angle, even if the inclination angle in the case of the manual placing is corrected completely, the correction of the inclination angle in the case of automatic document feeding is insufficient.

In the present embodiment, inclination angle (automatic conveyance) memory 37 which stores inclination angle θ' in automatic conveyance is provided in addition to inclination angle (reference plate) memory 36 which stores inclination angle θ in manual placing, and in the case of automatic conveyance, selector 39B calls inclination angle θ' from the inclination angle (automatic conveyance) memory 37, and thereby, inclination correction means 35 corrects inclination of image data.

A method to establish inclination angle θ' in inclination angle (automatic conveyance) memory 37 is the same as that to establish inclination angle θ in inclination angle (reference plate) memory 36. Namely, copying is conducted under the state wherein test pattern information stored in test pattern memory 38 which is the same as that in the manual placing is used, recording material P (M) having test pattern of L (M) shown in FIG. 5(*a*) is placed in the shape where the conveyance direction of the recording material is regulated by regulating member 22 provided on document placing table 21, and a reading start button is pressed to convey the recording material P (M) automatically to stop it at the reading position on the document platen 11. With regard to recording material P (C') on which copied image L (C') has been formed in the aforesaid way, even when it is used as a detection mean for inclination angle θ' in automatic conveyance, by overlapping it on recording material P (M) for studying, a scanning means is operated to scan under the condition that recording material P (S) having test pattern of L (S) shown in FIG. 6(a) is conveyed automatically from document placing table 21 to stop at the reading position on document platen 11, and operation processing is conducted from the results of detection obtained by image sensor 18, thus, inclination angle θ' in the case of automatic conveyance can be obtained.

The inclination angle θ' thus obtained is inputted in inclination angle (automatic conveyance) memory 37, and in the case of automatic conveyance of a document, inclination correction means 35 corrects inclination of image data by using inclination angle θ' stored in inclination angle (automatic conveyance) memory 37, and outputs to printer section 32, thus, images are formed on a transfer material by image forming program 33.

Incidentally, in the present embodiment, inclination angle (reference plate) memory 36 and inclination angle (automatic conveyance) memory 37 are provided separately. However, it is also possible to employ one wherein both two memories stated above are contained in one memory. In that case, an area to store inclination angle θ based on inclination of a reference plate and an area to store inclination angle θ' based on inclination of an automatic document feeding means may be provided separately, so that a desired inclination angle may be read properly by selector 39B. It is also possible to structure so that each inclination angle may be stored in image memory 34, but it is preferable to provide an image memory and an inclination angle memory separately from the viewpoint of easy handling of data and easy processing of memory, because image data and inclination angle data are different in terms of frequency of rewriting.

In the present embodiment, there has been explained an apparatus wherein an end portion of a document does not hit reference plate 13 when the document is stopped, when the document conveyed by an automatic document feeding apparatus is stopped at the reading position. However, the invention is not limited only to the apparatus of the aforesaid type. Namely, the invention includes also an apparatus wherein an end portion of a document hits a reference plate when the document is conveyed by an automatic document feeding apparatus, and thereby the document is stopped to be in line with the reference plate. In the case of that apparatus, an inclination angle of a document at the reading position for both an occasion where a document is fed to the reading position through manual placing and an occasion where a document is fed to the reading position by an automatic document feeding apparatus, is only one caused by an inclination angle caused by a slip of the mounting position of the reference plate. Therefore, in that case, a block diagram for the flow of image reading and image forming is one shown in FIG. 2 which is the same as that in Embodiment 1.

In the foregoing, there has been explained an embodiment wherein a document in the case of automatic conveyance is read by image sensor 18 when the document is scanned by a scanning means (light source 14, first mirror and V mirror) at the fixed reading position on document platen 11. However, the invention is not limited to this, and for example, the invention may also be applied equally to an image reading apparatus wherein document images are read by image sensor 18 under the condition that a scanning means is fixed for the moving document, in the course of conveying the document from document placing table 21 with a document conveyance means.

The invention makes it possible to provide an image reading apparatus to read a manually placed document wherein an accurate image which is free from inclination can be formed even when no fine adjustment is made for positional adjustment on a document positioning member which is used for placing the document.

The invention makes it possible to provide an image reading apparatus capable of reading a document placed to be in line with a document positioning member of a document platen through manual placing and capable of reading a document conveyed by a document feeder, wherein an accurate image which is free from inclination and/or distortion can be formed for both manual placing and automatic document feeding, when neither fine adjustment of the document position nor adjustment for the slip of a conveyance system of a document feeder is needed.

The invention makes it possible to provide an image forming apparatus which is capable of reading a document placed to be in line with a document positioning member on a document holder through manual placing and of reading a document conveyed by an automatic document feeding apparatus and forms an image, wherein an adjustment of the mounting position for a document positioning member and an adjustment of the slip of a conveyance system of a document feeder are simplified, and an accurate image which is free from inclination and/or distortion can be formed.

What is claimed is:

1. An image reading apparatus, comprising:
    a document holder on which a document is placed;
    a document positioning member with reference to which the document is positioned on the document holder;
    mode selection means for selecting an image adjustment mode,
    wherein test pattern information stored in a test pattern memory is recorded on a first recording material, the first recording material is then placed on the document holder with reference to the document positioning member, and the test pattern information is then copied onto a second recording material, and
    wherein the test pattern information recorded on the first recording material is compared with the test pattern information copied onto the second recording material;
    means for detecting an inclination angle of the document positioning member with respect to a main body of the image reading apparatus according to the comparison result of the test pattern information, and for storing inclination information based on the detected inclination angle of the document positioning member;
    an image reading device for reading an image of the document positioned on the document holder; and
    a correcting device for correcting an inclination angle of the image read by the image reading device in accordance with the stored inclination information.

2. The image reading apparatus of claim 1, wherein the means for storing the inclination information comprises a memory.

3. The image reading apparatus of claim 2, further comprising an inputting device for inputting the inclination information to the memory.

4. The image reading apparatus of claim 3, wherein the inputting device is connected to an outside inputting device, and the inputting device receives the inclination information from the outside inputting device.

5. An image reading apparatus comprising:

a document holder on which a document is placed;

a document feeder for feeding the document in a feeding direction and stopping the document on the document holder;

mode selection means for selecting an image adjustment mode, wherein test pattern information stored in a test pattern memory is recorded on a first recording material, the first recording material is then placed on a document placing table and automatically conveyed to a reading position on the document holder, and the test pattern information is then copied onto a second recording material while the first recording material is stopped, and wherein the test pattern information recorded on the first recording material is compared with the test pattern information copied onto the second recording material;

means for detecting an inclination angle of the test pattern information according to the comparison result of the test pattern information, and for storing inclination information based on the detected inclination angle;

an image reading device for reading an image of the document stopped on the document holder, wherein the image reading device moves in a sub-scanning direction so as to read the image; and a correcting device for correcting an inclination angle of the image read by the image reading device in accordance with the stored inclination information.

6. The image reading apparatus of claim 5, wherein the means for storing the inclination information comprises a memory.

7. The image reading apparatus of claim 6, further comprising an inputting device for inputting the inclination information to the memory.

8. The image reading apparatus of claim 7, wherein the inputting device is connected to an outside inputting device, and the inputting device receives the inclination information from the outside inputting device.

9. An image reading apparatus comprising:

a document holder on which a document is placed;

a document feeder for feeding the document in a feeding direction and stopping the document on the document holder;

means for detecting an inclination angle of a test pattern image fed by the document feeder and stopped on the document holder, and for first storing inclination information based on the detected inclination angle;

a document positioning member with reference to which the document is positioned on the document holder;

means for detecting an inclination angle of the document positioning member with respect to a main body of the image reading apparatus, and for storing second inclination information based on the detected inclination angle of the document positioning member;

an image reading device for reading an image of the document stopped on the document holder, wherein the image reading device moves in a sub-scanning direction so as to read the image; and a correcting device for correcting an inclination angle of the image read by the image reading device in accordance with the second inclination information when the document is positioned on the document holder without being fed by the document feeder, and for correcting the inclination angle of the image read by the image reading device in accordance with the first inclination information when the document is fed and stopped on the document holder by the document feeder.

10. The image reading apparatus of claim 9, wherein the means for storing the first inclination information and the means for storing the second inclination comprises at least one memory.

11. The image reading apparatus of claim 10, wherein the at least one memory comprises a first memory for storing the first inclination information and a second memory for storing the second inclination information.

12. The image reading apparatus of claim 10, further comprising an inputting device for inputting the first inclination information and the second inclination information.

13. The image reading apparatus of claim 12, wherein the inputting device is connected to an outside inputting device, and the inputting device receives the inclination information from the outside inputting device.

14. The image reading apparatus of claim 1, further comprising a document feeder for feeding the document on the document holder and hitting the document against the document positioning member so as to position the document at a predetermined position.

15. An image forming apparatus comprising:

a document holder on which a document is placed;

a document positioning member with reference to which the document is positioned on the document holder;

mode selection means for selecting an image adjustment mode, wherein test pattern information stored in a test pattern memory is recorded on a first recording material, the first recording material is then placed on the document holder with reference to the document positioning member, and the test pattern information is then copied onto a second recording material, and wherein the test pattern information recorded on the first recording material is compared with the test pattern information copied onto the second recording material;

means for detecting an inclination angle of the document positioning member with respect to a main body of the image reading apparatus according to the comparison result of the test pattern information, and for storing inclination information based on the detected inclination angle of the document positioning member;

an image reading device for reading an image of the document positioned on the document holder;

a correcting device for correcting an inclination angle of the image read by the image reading device in accordance with the stored inclination information; and an image recording device for recording the image corrected by the correcting device on a recording material.

16. The image forming apparatus of claim 15, further comprising a calculating device for calculating the inclination angle of the image read by the image reading device, and wherein the inclination angle of the image read by the image reading device is utilized to detect the inclination angle of the document positioning member.

17. The image forming apparatus of claim 16, wherein the image read by the image reading device is a test pattern image, and the image reading device comprises:

a plurality of charge coupled devices arranged along a primary scanning direction; and detector for detecting a number of pixels, read by the plurality of charge coupled devices, of a straight line drawn in a sub-scanning direction perpendicular to the primary scanning direction on the test pattern image; and wherein the calculating device calculates the detected inclination angle of the document positioning member based on the number of pixels detected by the detector.

18. The image forming apparatus of claim 17, further comprising a test pattern image memory for storing test pattern image data indicating the test pattern image, wherein the test pattern image is recorded by the image recording device based on the test pattern image data and the test pattern image comprises a straight line which is perpendicular to a predetermined edge of the recording material; and wherein the image reading device reads the straight line of the test pattern image so that the predetermined edge of the recording material accords with the document positioning member.

19. The image forming apparatus of claim 17, wherein the means for storing the inclination information comprises a memory.

20. An image forming apparatus comprising:

a document holder on which a document is placed;

a document feeder for feeding the document and stopping the document on the document holder;

mode selection means for selecting an image adjustment mode, wherein test pattern information stored in a test pattern memory is recorded on a first recording material, the first recording material is then placed on a document placing table and automatically conveyed to a reading position on the document holder, and the test pattern information is then copied onto a second recording material while the first recording material is stopped, and wherein the test pattern information recorded on the first recording material is compared with the test pattern information copied onto the second recording material;

means for detecting an inclination angle of the test pattern information according to the comparison result of the test pattern information, and for storing inclination information based on the detected information angle;

an image reading device for reading an image of the document stopped by the document holder, wherein the image reading device moves in a sub-scanning direction so as to read the image;

a correcting device for correcting an inclination angle of the image read by the image reading device in accordance with the stored inclination information; and an image recording device for recording the image corrected by the correcting device on a recording material.

21. The image forming apparatus of claim 20, further comprising a calculating device for calculating the inclination angle of the image read by the image reading device so as to calculate an inclination angle of a feeding direction by the document feeder.

22. The image forming apparatus of claim 21, wherein the image reading device comprises:

a plurality of charge coupled devices arranged along a primary scanning direction; and a detector for detecting a number of pixels, read by the plurality of charge coupled devices, of a straight line drawn in a sub-scanning direction perpendicular to the primary scanning direction on the test pattern image, so as to detect an inclination angle of the test pattern image read by the image reading device;

wherein the calculating device calculates the detected inclination angle of feeding direction by the document feeder based on the number of pixels detected by the detector.

23. The image forming apparatus of claim 22, further comprising a test pattern image memory for storing test pattern image data indicating the test pattern image, wherein the test pattern image is recorded by the image recording device based on the test pattern image data and the test pattern image comprises a straight line which is perpendicular to a predetermined edge of the recording material; and wherein the image reading device reads the straight line of the test pattern image recorded by the image recording device based on the test pattern image data and fed by the document feeder.

24. The image forming apparatus of claim 22 wherein the means for storing the inclination information comprises a memory.

25. An image reading apparatus comprising:

a document holder on which a document is placed;

a document feeder for feeding the document in a feeding direction and stopping the document on the document holder;

means for detecting an inclination angle of a test pattern image fed by the document feeder and stopped on the document holder, and for first storing inclination information based on the detected inclination angle;

a document positioning member with reference to which the document is positioned on the document holder;

means for detecting an inclination angle of the document positioning member with respect to a main body of the image reading apparatus, and for storing second inclination information based on the detected inclination angle of the document positioning member;

an image reading device for reading an image of the document stopped on the document holder, wherein the image reading device moves in a sub-scanning direction so as to read the image;

a correcting device for correcting an inclination angle of the image read by the image reading device in accordance with the second inclination information when the document is positioned on the document holder without being fed by the document feeder, and for correcting the inclination angle of the image read by the image reading device in accordance with the first inclination information when the document is fed and stopped on the document holder by the document feeder; and an image recording device for recording the image corrected by the correcting device on a recording material.

26. The image forming apparatus of claim 25, further comprising a calculating device for calculating the inclination angle of the image read by the image reading device according to the inclination angle of the document positioning member and the feeding direction by the document feeder.

27. The image forming apparatus of claim 26, wherein the image reading device comprises:

a plurality of charge coupled devices arranged along a primary scanning direction; and a detector for detecting a number of pixels, read by the plurality of charge coupled devices, of a straight line drawn in a sub-scanning direction perpendicular to the primary scanning direction on the test pattern image, so as to detect an inclination angle of the test pattern image read by the image reading device;

wherein the calculating device calculates the detected inclination angle of the document positioning member and the feeding direction by the document feeder based on the number of pixels detected by the detector.

28. The image forming apparatus of claim 27, further comprising a test pattern image memory for storing test pattern image data indicating the test pattern image, wherein the test pattern image is recorded by the image recording device based on the test pattern image data and the test pattern image comprises a straight line which is perpendicular to a predetermined edge of the recording material; and wherein the image reading device reads the straight line of the test pattern image so that the predetermined edge of the recording material accords with the document positioning member, and the image reading device reads the straight line of the test pattern image recorded by the image recording device based on the test pattern image data and fed by the document feeder.

29. The image forming apparatus of claim 27 wherein the means for storing the first inclination information comprises a first memory, and the means for storing the second inclination comprises a second memory.

30. An image forming apparatus comprising:

a document holder through which a document passes;

a document feeder for feeding a document to an image reading position on the document holder;

mode selection means for selecting an image adjustment mode, wherein test pattern information stored in a test pattern memory is recorded on a first recording material, the first recording material is then placed on a document placing table and automatically conveyed to a reading position on the document holder, and the test pattern information is then copied onto a second recording material while the first recording material is stopped, and wherein the test pattern information recorded on the first recording material is compared with the test pattern information copied onto the second recording material;

means for detecting a distortion of the test pattern information according to the comparison result of the test pattern information, and for storing distortion information based on the detected distortion;

an image reading device for reading an image of the document while the document passes through the image reading position; and a correcting device for correcting a distortion of the image read by the image reading device in accordance with the stored distortion information.

31. The image reading apparatus of claim 30, wherein the means for storing the distortion information comprises a memory, and wherein the distortion information is calculated based on an inclination angle of a feeding direction by the document feeder.

32. The image reading apparatus of claim 31, further comprising an inputting device for inputting the distortion information to the memory.

33. The image reading apparatus of claim 32, wherein the inputting device is connected to an outside inputting device, and the inputting device receives the distortion information from the outside inputting device.

34. The image reading apparatus of claim 30, further comprising:

a document positioning member with reference to which the document is positioned on the document holder; and means for detecting an inclination angle of the document positioning member with respect to a main body of the image reading apparatus, and for storing inclination information based on the detected inclination angle of the document positioning member;

wherein the correcting device corrects an inclination angle of the image read by the image reading device in accordance with the stored inclination information when the document is positioned on the document holder without being fed by the document feeder; and wherein the correcting device corrects the distortion of the image read by the image reading device in accordance with the inclination angle of the feeding direction by the document feeder when the document is fed by the document feeder to the image reading position.

* * * * *